United States Patent [19]

Oehrle et al.

[11] Patent Number: 4,667,966
[45] Date of Patent: May 26, 1987

[54] SEAL ARRANGEMENT FOR THE GAP BETWEEN A RIGID SLIDING COVER AND A FIXED ROOF AREA OF A MOTOR VEHICLE SURROUNDING THE SAME

[75] Inventors: Rolf Oehrle, Herrenberg; Werner Herlemann, Aidlingen, both of Fed. Rep. of Germany

[73] Assignee: Daimler-Benz Aktiengesellschaft, Fed. Rep. of Germany

[21] Appl. No.: 795,166

[22] Filed: Nov. 5, 1985

[30] Foreign Application Priority Data

Nov. 22, 1984 [DE] Fed. Rep. of Germany ....... 3442653

[51] Int. Cl.⁴ .................. F16J 15/10; B60J 7/02; B60J 7/195; E06B 7/16
[52] U.S. Cl. ........................ 277/12; 49/475; 49/498; 277/207 R; 277/189; 277/226; 296/216; 296/222
[58] Field of Search ............ 277/226, 189, 207 R; 296/214, 216, 218, 221, 222; 49/486, 498, 475

[56] References Cited

U.S. PATENT DOCUMENTS

| | | | |
|---|---|---|---|
| 2,368,837 | 2/1945 | Hubacker | 49/486 X |
| 2,723,896 | 11/1955 | Wurtz | 49/486 |
| 2,968,845 | 1/1961 | Dickinson | 49/486 |
| 4,289,321 | 9/1981 | Cather, Jr. | 277/182 X |
| 4,312,534 | 1/1982 | Jardin et al. | 296/216 |

FOREIGN PATENT DOCUMENTS

| | | |
|---|---|---|
| 2535218 | 2/1977 | Fed. Rep. of Germany . |
| 3336307 | 4/1985 | Fed. Rep. of Germany ...... 296/216 |
| 2457368 | 1/1981 | France ................. 49/498 |

Primary Examiner—Allan N. Shoap
Attorney, Agent, or Firm—Barnes & Thornburg

[57] ABSTRACT

In order to be able to cover a large tolerance range with a sliding cover for a motor vehicle, which is sealed by way of a circumferential hollow chamber seal, the hollow chamber seal is provided with a bead which is supported only locally at the end face of a rail retaining the hollow chamber seal under a roof area. During the occurrence of excessively large, oversize tolerances, the hollow chamber seal can then enter into interstices formed between local raised portions of the end face when the deformation capability of the hollow chamber is exhausted.

6 Claims, 4 Drawing Figures

SEAL ARRANGEMENT FOR THE GAP BETWEEN A RIGID SLIDING COVER AND A FIXED ROOF AREA OF A MOTOR VEHICLE SURROUNDING THE SAME

The present invention relates to a seal arrangement for the gap between a rigid sliding cover and a fixed roof area of a motor vehicle surrounding the same by means of a circumferential hollow chamber seal which is securely received underneath the fixed roof area by a rail fastened on the roof.

Such a seal arrangement is disclosed in the German Pat. No. 11 82 082 and offers the advantage that even during the occurrence of slight tolerances the actuating forces for the sliding cover can be maintained within acceptable limits. However, if larger tolerances occur, then the danger exists that the sealing action is no longer adequate or the actuating forces reach a value that is no longer acceptable.

It is the object of the present invention to so modify the seal arrangement that also larger tolerances can be compensated without leading to sealing or movement problems.

The underlying problems are solved according to the present invention in that the hollow chamber seal includes a bead coordinated to the end face of the rail, which is supported at the end face only locally. One obtains thereby two series-connected compensating possibilities whereby the bead-like local support at the rail appropriately becomes effective reinforced only when the deformation capability of the hollow chamber is far-reachingly exhausted.

In a preferred embodiment of the present invention, the bead abuts at raised portions formed out of the end face such as at teeth or the like so that for the compensation of larger positive tolerances sealing material can be displaced into the interstices formed between the raised portions.

The DE-AS No. 25 35 218 already discloses to provide the longitudinal sides of the roof adjoining a rigid sliding cover with grooves, into the recesses of which elastic material is adapted to be displaced; however, this prior art involves brake surfaces which are acted upon only locally by pressure members pressed outwardly during the fixing operation of the sliding cover.

These and other objects, features and advantages of the present invention will become more apparent from the following description when taken in connection with the accompanying drawing which shows, for purposes of illustration only, one embodiment in accordance with the present invention, and wherein.

Figure 1:
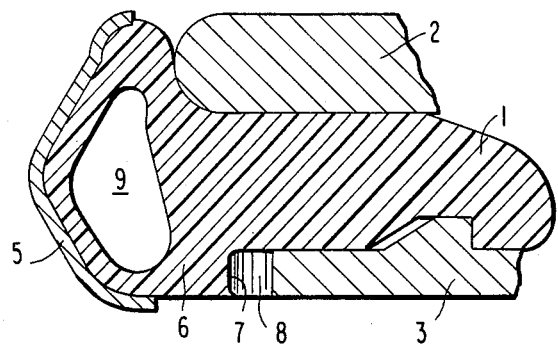
FIG. 1 is a cross-sectional view through a hollow chamber seal in accordance with the present invention secured underneath a roof area and in the unstressed condition.

Referring now to the drawing wherein like reference numerals are used throughout the various views to designate like parts, a hollow chamber seal 1 which extends circumferentially in a manner not illustrated in detail, is securely held underneath a roof area 2 by means of a rail 3 fixed (not shown) at the roof. The hollow chamber seal 1 includes a low friction coating 5 at the abutment side of a sliding cover 4 (FIGS. 2 and 3) and is provided with a bead 6 which, in the normal case, is supported only locally at the end face 7 of the rail 3. In order to achieve this in a simple manner, raised portions 8 project from the end face 7 whose distance from one another is so selected that during the occurrence of normal tolerance deviations only the hollow chamber 9 of the hollow chamber seal 1 is reduced without the occurrence of a sagging of the hollow chamber seal 1, as this is illustrated in FIG. 2.

Figure 2:
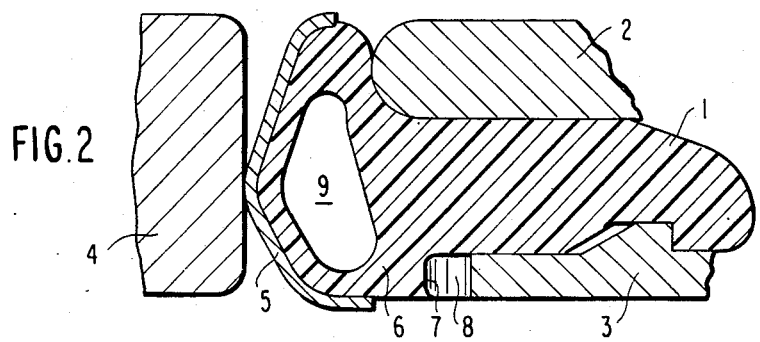
FIG. 2 is a cross-sectional view through the hollow chamber seal according to FIG. 1 during abutment of a sliding cover and the occurrence of normal tolerances.
Figure 3:
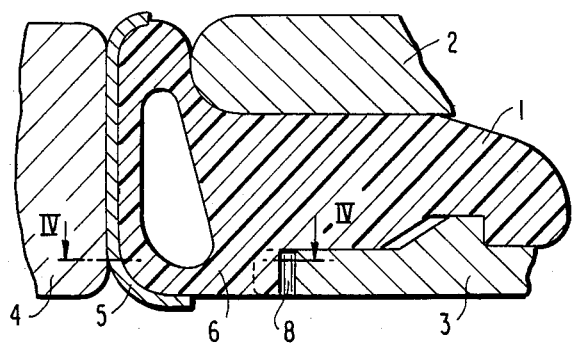
FIG. 3 is a cross-sectional view, similar to FIG. 2, during the occurrence of an extreme oversize.
Figure 4:
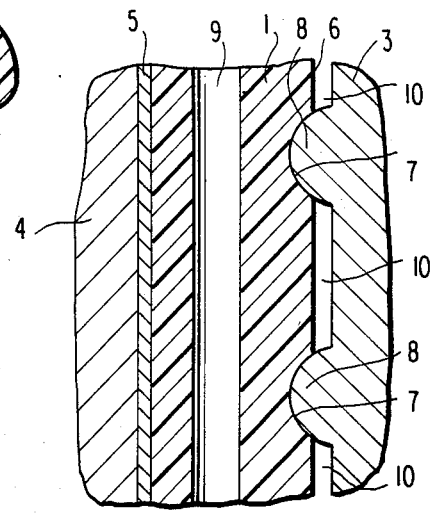
FIG. 4 is a cross-sectional view taken along line IV—IV of FIG. 3.

If, in contrast, extreme tolerances occur, then starting from the illustration according to FIG. 2, a displacement of the hollow chamber seal 1 within the area of the bead 6 into the interstices 10 takes place during the exhaustion of the deformation capability of the hollow chamber 9 (FIG. 4) which interstices 10 extend between the raised portions 8. FIGS. 3 and 4 illustrate this condition. A hollow chamber seal 1 is created in this manner which operates completely satisfactorily over a large tolerance range and which permits under all possible conditions an easy movement of the sliding cover 4.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A seal arrangement for the gap between a rigid sliding cover means and a roof means of a motor vehicle surrounding the sliding cover means by way of the seal arrangement, comprising a perimetrical hollow chamber seal means, a rail means for securely receiving the hollow chamber seal means underneath a fixed area of the roof means, said rail means being fixed at the vehicle roof and having an edge portion facing the seal means, the hollow chamber seal means including an end portion juxtaposed to the edge portion of the rail means, and said end portion being supported by a plurality of supports at the edge portion of the rail means which are located at a plurality of spaced apart locations on the edge portion of the rail means, and said end portion of the seal means being separated and spaced from the edge portion of the rail means at the formed spaces between the support means.

2. A seal arrangement according to claim 1, wherein the spaced apart supports for the end portion of the seal means at the edge portion of the rail means is an abutting support at spaced apart raised portions of the edge portion of the rail means.

3. A seal arrangement according to claim 2, wherein said raised portions are tooth-like projections.

4. A seal arrangement according to claim 3, wherein a closing force is applied to the seal upon closing of the cover to cause the hollow chamber means to first deform and subsequently to deform the bead about the spaced apart supports if the closing force is greater than is necessary to deform the hollow chamber means.

5. A seal arrangement according to claim 2, wherein a closing force is applied to the seal upon closing of the cover to cause the hollow chamber means to first deform and subsequently to deform the end portion about the spaced apart supports if the closing force is greater than is necessary to deform the hollow chamber means.

6. A seal arrangement according to claim 1, wherein a closing force is applied to the seal upon closing of the cover to cause the hollow chamber means to first deform and subsequently to deform the end portion about the spaced apart supports if the closing force is greater than is necessary to deform the hollow chamber means.

* * * * *